United States Patent [19]

O'Brien

[11] Patent Number: 4,660,059

[45] Date of Patent: Apr. 21, 1987

[54] COLOR PRINTING MACHINE

[75] Inventor: John F. O'Brien, Penfield, N.Y.

[73] Assignee: Xerox Corporation, Stamford, Conn.

[21] Appl. No.: 801,434

[22] Filed: Nov. 25, 1985

[51] Int. Cl.[4] .............................................. G01D 15/10

[52] U.S. Cl. .................................... 346/157; 346/159; 400/119

[58] Field of Search ...................... 346/153.1, 157, 159; 400/119; 358/300; 101/DIG. 13; 355/106

[56] References Cited

U.S. PATENT DOCUMENTS

| | | | |
|---|---|---|---|
| 4,155,093 | 5/1979 | Fotland et al. | 346/159 |
| 4,160,257 | 7/1979 | Carrish | 346/159 |
| 4,267,556 | 5/1981 | Fotland et al. | 346/153.1 |
| 4,356,245 | 10/1982 | Hosono et al. | 430/122 |
| 4,365,549 | 12/1982 | Fotland et al. | 101/1 |
| 4,395,476 | 7/1983 | Kanbe et al. | 430/102 |
| 4,408,214 | 10/1983 | Fotland et al. | 346/159 |
| 4,409,604 | 10/1983 | Fotland | 346/159 |
| 4,416,533 | 11/1983 | Tokunaga et al. | 358/300 |
| 4,463,363 | 7/1984 | Gundlach et al. | 346/159 |
| 4,473,627 | 9/1984 | Kanbe et al. | 430/102 |
| 4,496,232 | 1/1985 | Guzik | 346/160 |
| 4,538,163 | 8/1985 | Sheridon | 346/155 |

OTHER PUBLICATIONS

Xerox Disclosure Journal, vol. 1, No. 7, Jul. 1976, p. 29: Color Xerography with Intermediate Transfer.

*Primary Examiner*—Arthur G. Evans

*Attorney, Agent, or Firm*—H. Fleischer; J. E. Beck; R. Zibelli

[57] ABSTRACT

An apparatus in which a document is printed in at least two different colors. Ions are projected onto the surface of a receiving member to record at least two electrostatic latent images thereon. Each of the electrostatic latent images recorded on the receiving member is developed with different color marking particles. The different color marking particles are transferred substantially simultaneously from the receiving member to the document to print the desired information thereon.

14 Claims, 2 Drawing Figures

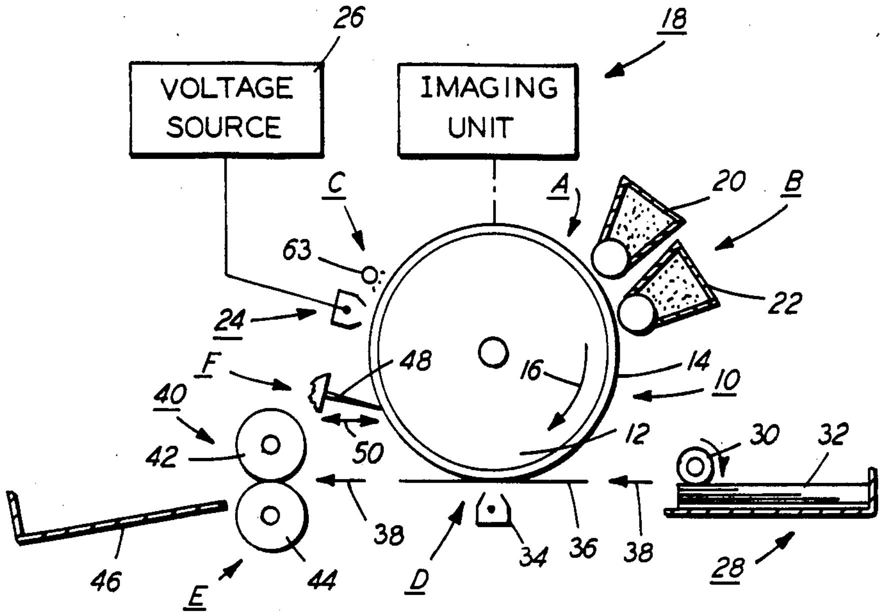
F/G. 1
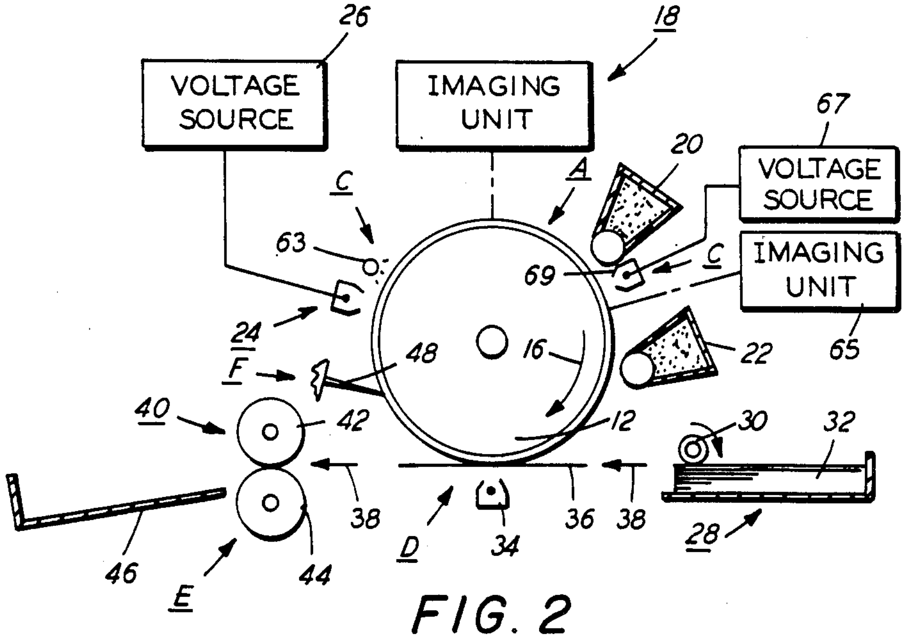
F/G. 2

COLOR PRINTING MACHINE

BACKGROUND OF THE INVENTION

This invention relates generally to a color printing machine, and more particularly concerns a printing machine in which a document is printed in at least two different colors wherein the colors are reproduced simultaneously on the document sheet.

Hereinbefore, multicolor copying was achieved by using a multicolor electrophotographic printing machine. In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer mixture is transported into contact with the electrostatic latent image. Toner particles are attracted from the carrier granules of the developer mixture onto the latent image. The resultant toner powder image is then transferred from the photoconductive surface to a copy sheet and permanently affixed thereto. The foregoing generally describes a conventional black and white electrophotographic copying machine. With the advent of multicolor electrophotographic printing, the process was essentially repeated for three or four cycles. Thus, the charged photoconductive surface is exposed to filtered light image. The resultant electrostatic latent image is then developed with toner particles corresponding in color to the substractive primary of the filtered light image. For example, when a red filter is employed, the electrostatic latent image is developed with toner particles which are cyan in color. The cyan toner powder image is then transferred to the copy sheet. The foregoing process is repeated for a green filtered light image which is developed with magenta toner particles and a blue filtered light image which is developed with yellow toner particles. Each differently colored toner powdered image is sequentially transferred to the copy sheet in superimposed registration with the powder image previously transferred thereto. In this way, three toner powder images are transferred sequentially to the copy sheet. After the toner powder images have been transferred to the copy sheet, they are permanently fused thereto. Thus, color electrophotographic machines previously employed required three passes to produce a multicolor copy. This, of course, reduced the speed of the printing machine. A typical electrophotographic printing employing the foregoing process is manufactured by the Xerox Corporation under the model name 6500.

With the advent of ion projection devices, an electrostatic latent image can be deposed upon a charge receptor surface. The resultant charge pattern may then be developed in a conventional manner. A printing machine utilizing an ion projection system is a relatively simple device and less complex than those previously employed. Moreover, an ion projection apparatus may be employed in a multicolor electrophotographic printing machine. Various types of ion projection devices have been developed. These are described in U.S. Pat. No. 4,538,163, issued on Aug. 27, 1985 to Sheridon; U.S. Pat. No. 4,463,363, issued on July 31, 1984 to Gundlach et al; U.S. Pat. No. 4,409,604, issued on Oct. 11, 1983 to Fotland; U.S. Pat. No. 4,408,214, issued on Oct. 4, 1983 to Fotland et al; U.S. Pat. No. 4,365,549, issued on Dec. 28, 1982 to Fotland et al; U.S. Pat. No. 4,267,556, issued on May 12, 1981 to Fotland et al; U.S. Pat. No. 4,160,257, issued on July 30, 1979 to Carrish; and U.S. Pat. No. 4,155,093, issued on May 15, 1979 to Fotland et al. All of the foregoing patents describe various types of ion projection devices which may be employed in printing systems to produce a charge pattern on a charge receiving surface.

In the area of multicolor electrophotographic printing, it is highly desirable to simultaneously transfer all of the toner powder images to the copy sheet rather than having to do it sequentially. Various approaches have been devised to achieve the foregoing. The following disclosure appears to be relevant:

Xerox Disclosure Journal, Vol. 1, No. 7, July 1976, Page 29; Color Xerography With Intermediate Transfer, Author: J. R. Davidson.

Davidson describes a xerographic development apparatus wherein four different color toner powder images are developed on their respective photoconductive drums. Thereafter, each toner powder image is transferred to an intermediate web and subsequently transferred in superimposed registration with one another onto the copy sheet.

SUMMARY OF THE INVENTION

In accordance with the features of the present invention, there is provided an apparatus for printing a document in at least two different colors. The apparatus includes a receiving member with means for projecting ions onto the surface thereof and for recording at least two electrostatic latent images thereon. Means develop each of the electrostatic latent images recorded on the receiving member with different color marking particles. Means are provided for transferring simultaneously the different color marking particles from the receiving member to the document to print the desired information thereon.

Other aspects of the present invention will become apparent as the following description proceeds and upon reference to the drawings, in which:

BRIEF DESCRIPTION OF THE DRAWINGS

FIG. 1 is a schematic elevational view showing an illustrative printing machine incorporating the features of the present invention therein; and FIG. 2 depicts another embodiment of the FIG. 1 printing machine.

DESCRIPTION OF THE PREFERRED EMBODIMENTS

While the present invention will hereinafter be described in conjunction with various embodiments thereof, it will be understood that it is not intended to limit the invention to these embodiments. On the contrary, it is intended to cover all alternatives, modifications, and equivalents as may be included in the spirit and scope of the invention as defined by the appended claims.

For a general understanding of the features of the present invention, reference is made to the drawings. In the drawings, like reference numerals have been used throughout to designate identical elements. FIG. 1 schematically depicts the various components of an illustrative printing machine incorporating the features of the present invention therein. It will become evident from the following discussion that the features of the present invention are equally well suited for use in a wide variety of electrostatographic printing machines and are not necessarily limited in their application to the particular embodiments depicted herein.

Inasmuch as the art of electrostatographic printing is well known, the various processing stations employed in the FIG. 1 printing machine will be shown hereinafter and their operation described briefly with reference thereto.

As shown in FIG. 1, the illustrative printing machine employs a dielectric roller, indicated generally by the reference numeral 10. Dielectric roller 10 includes a conductive core 12 coated with a thin layer 14 of dielectric material. By way of example, conductive core 12 may be made from a suitable metallic material such as aluminum with dielectric layer 14 being made from a plastic material or anodized aluminum oxide. Preferably, the resistivity of dielectric layer 14 is greater than $10^{12}$ ohm-centimeters. Dielectric roller 10 rotates in a direction of arrow 16 to advance successive portions of dielectric layer 14 sequentially through the various processing stations disposed about the path of movement thereof.

Initially, a portion of dielectric layer 14 passes through imaging station A. At imaging station A, an imaging unit 18 records an electrostatic latent image on dielectric layer 14. Imaging unit 18 includes an ion projecting generator which produces a rapidly flowing stream of ions flowing toward dielectric layer 14. Modulation electrodes associated therewith selectively neutralize the ions so that ions of a selected sign may be accelerated toward and deposited, in an image wise pattern, upon dielectric layer 14 to record an electrostatic latent image thereon. A suitable ion generator having modulation electrodes is described in U.S. Pat. No. 4,538,163, issued on Aug. 27, 1985 to Sheridon, the relevant portions thereof being hereby incorporated into the present application. In this way, the first electrostatic latent image is recorded on dielectric layer 14 of dielectric roller 10. When forming a multicolor copy, a plurality or at least two electrostatic latent images are recorded on dielectric layer 10. At this time, however, only the first or initial electrostatic latent image is recorded thereon. The electrostatic latent image recorded on dielectric layer 14 is advanced to development station B as roller 10 rotates in the direction of arrow 16.

Development station B includes at least two developer units, developer unit 20 and developer unit 22. Developer units 20 and 22 are substantially identical to one another with the only distinction being the color of the toner particles contained therein. Developer unit 20 has black toner particles with developer unit 22 having toner particles of a different color, e.g. red toner particles. Thus, if the first electrostatic latent image recorded on dielectric layer 14 corresponds to those regions of the document which are to be created in black, developer unit 20 is energized. Developer unit 20 deposits black toner particles on the electrostatic latent image. At this time, developer unit 22 is de-energized as no red toner particles are being deposited on the electrostatic latent image. Developer units 20 and 22 are of type known in the art as "toner projection" or "jumping development" development systems. Development systems of this type include a hopper storing a supply of single component developer material, i.e. toner particles, which are furnished to a rotating, nonmagnetic sleeve. A stationary magnetic sleeve is disposed interiorly of the rotating sleeve. The toner particles are magnetic. These toner particles are attracted to the rotating sleeve and advanced to the development zone thereby. When the sleeve is stationary, no toner particles are advanced to the development zone. Thus, when the developer unit is deenergized, the sleeve remains stationary and non-rotating. Development systems of this type are described in U.S. Pat. No. 4,356,245, issued to Hosono et al. on Oct. 26, 1982; U.S. Pat. No. 4,395,476, issued to Kanbe et al. on July 26, 1983; and U.S. Pat. No. 4,473,627, issued to Kanbe et al. on Sept. 24, 1984; the relevant portions of all of the foregoing patents being hereby incorporated into the present application by reference. After the black toner particles are deposited on the first electrostatic latent image recorded on dielectic roller 10, dielectric roller 10 continues to rotate in the direction of arrow 16 to advance these black toner powder image to neutralizing station C.

At neutralizing station C, a corona generating unit indicated generally by the reference numeral 24 is coupled to a voltage source 26. Voltage source 26 electrically biases corona generator 24. Thus, corona generator 24 is excited by an A.C. voltage superimposed over a D.C. bias level. This erases the electrostatic latent image and increases the net charge of the black toner powder image to tack it to dielectric layer 14 electrostatically. This also prevents back development during development of the next electrostatic latent image. If the dielectric layer 14 is also a photoconductive material, an erase lamp 63 can be used to help neutralize the developed image pattern at station C. The black toner powder image deposited on dielectric layer 14 of roller 10 advances now back to imaging unit 18. Once again, imaging unit 18 is energized and the ion projector generates a flow or stream of ions which are modulated and deposited on dielectric layer 14 in those regions where color highlighted information is to be displayed, i.e. the red portions of the document. This second electrostatic latent image is now advanced to development station B. At development station B, developer unit 22 is energized and developer unit 20 de-energized. Developer unit 22 has red toner particles therein. Developer unit 22 is electrically biased to a higher level than developer unit 20 so that the non-electrostatic latent image areas on dielectric layer 14 are low field regions and develop a weak cleaning field during development. In this way, the red toner particles are only attracted to the second electrostatic latent image. At this time, dielectric layer 14 has both red and black toner particles, i.e. marking particles, deposited on the surface thereof. As dielectric roller 10 continues to rotate in the direction of arrow 16, both of these differently colored toner particles are advanced to transfer station D.

At transfer station D, a document sheet is moved into contact with both the red and black powder images. The document sheet is advanced to transfer station D by a sheet feeding apparatus, indicated generally by the reference numeral 28. Preferably, sheet feeding apparatus 28 includes a feed roll 30 contacting the uppermost sheet of a stack of documents 32. Feed roll 30 rotates in the direction of arrow 34 to advance the uppermost document sheet to sheet guides and rollers (not shown) which forward the document sheet to transfer station D in a timed sequence.

Preferably, transfer station D includes a corona generating device 34 which sprays ions onto the backside of the document sheet. This attracts the powder image from dielectric layer 14 to the document sheet. After transfer, document sheet 36 continues to move in the direction of arrow 38 onto a conveyor (not shown) which advances the sheet to fusing station E.

Fusing station E includes a fuser assembly, indicated generally by the reference numeral 40, which permanently affixes the transferred powder images to the document sheet. Preferably, fuser assembly 40 includes a heated fuser roller 42 and back-up roller 44 with the powder images contacting fuser roller 42. In this manner, the powder images are permanently fused to the document sheet. After fusing, forwarding rollers (not shown) advance the document sheet to catch tray 46 for subsequent removal from the printing machine by the operator.

After the powder images are transferred from dielectric layer 14 to document sheet 36, roller 10 rotates dielectric layer 14 to cleaning station F. At cleaning station F, a cleaning blade 48 removes the residual toner particles adhering to dielectric layer 14. Cleaning blade 48 is adapted to move in the directions of arrow 50. Thus, cleaning blade 48 is moved toward dielectric layer 14 after both of the powder images have been transferred to document sheet 36 and moves away from dielectric layer 14 when only one toner powder image has been deposited on dielectric layer 14. In this way, cleaning blade 48 is adapted to remove only the residual toner particles adhering to dielectric layer 14 while being spaced from dielectric layer 14 after the black toner particles are deposited thereon.

Referring now to FIG. 2, there is shown another embodiment of the printing machine. As shown thereat, an ion projecting unit may be positioned after the developer unit. In this way, the process need not go through multi-drum cycles. Thus, ion projection units 18 and 65, respectively, may be positioned before developer unit 20 and between developer units 20 and 22. An additional neutralizing station C is located before ion projecting unit 65. Both toner powder images are deposited on dielectric layer 14 of roller 10 during one cycle. Initially, an image wise charge pattern is recorded on dielectric layer 14, developed with black toner particles by developer unit 20, the charge pattern neutralized by corona generator 69 and subsequently a new charge pattern in image wise configuration recorded thereon by ion projection unit 65. This second image or electrostatic latent image is then developed by developer unit 22 and corresponds to the red region. Thus, dielectric layer 14 would have deposited thereon both the black and red toner particles prior to passing through transfer station D. Upon passing through transfer station D, both the black and red toner particles are then transferred to document sheet 36 for subsequent fusing at fusing station 40. In this way, it is seen that through the use of an ion projector all of the toner powder images may be simultaneously transferred to the document sheet. This will significantly reduce the complexity of the printing machine and increase the number of documents that can be printed at a selected process speed. This also eliminates the requirement of registering the document sheet with successive toner powder images. Furthermore, in a system of the foregoing type, cleaning blade 48 need not translate, but may remain in contact with dielectric layer 14.

One skilled in the art will appreciate that three developer units may be used if process color documents are desired. A system of this type could be a subtractive system employing cyan, magenta, and yellow developer units. Three ion projection units are employed along with three neutralizing units with an ion projection unit and a neutralizing unit being interposed between each developer unit as depicted in FIG. 2. It should also be clear that four developer units may be employed in a subtractive system using undercolor removal if full color printing is desired. This system employs a black developer unit and cyan, magenta and yellow developer units. In a system of this type, four ion projection units are employed with an ion projection unit and a neutralizing station being interposed between each developer unit as heretofore discussed with regard to the system shown in FIG. 2.

In recapitulation, it is evident that the printing machine of the present invention records electrostatic latent images on a receiving member which are subsequently developed with different colored marking particles. These differently colored marking particles are then transferred substantially simultaneously, to a sheet. The sheet then passes through a fusing station wherein the differently colored marking particles are permanently affixed thereto forming a colored document.

It is, therefore, apparent that there has been provided in accordance with the present invention, an electrophotographic printing machine that fully satisfies the aims and advantages hereinbefore set forth. While this invention has been described in conjunction with various embodiments thereof, it is evident that many alternatives, modifications and variations will be apparent to those skilled in the art. Accordingly, it is intended to cover all such alternatives, modifications and variations that fall within the spirit and broad scope of the appended claims.

I claim:

1. An apparatus for printing a document in at least two different colors, including:

a receiving member;

means for projecting ions onto the surface of said receiving member and recording at least two electrostatic latent images thereon, wherein said projecting and recording means comprises means for generating a flow of ions toward said receiving member, and means for modulating the ions flowing toward said receiving member to deposit ions thereon in an image wise pattern to record the electrostatic latent images on said receiving member;

means for developing each of the electrostatic latent images recorded on said receiving member with different color marking particles;

means for transferring simultaneously the different color marking particles from said receiving member to the document to print the desired information thereon; and means for substantially permanently fusing the marking particles to the document.

2. An apparatus according to claim 1, further including means for substantially neutralizing the electrostatic latent image first recorded on said receiving member after said developing means deposits the marking particles thereon and prior to recording the next electrostatic latent image thereon.

3. An apparatus according to claim 2, wherein said receiving member includes a dielectric member.

4. An apparatus according to claim 2, wherein said receiving member includes a photoconductive member.

5. An apparatus according to claim 2, wherein said projecting and recording means records the second electrostatic latent after said developing means develops the first electrostatic latent image with marking particles of a different color and said neutralizing means neutralizes the first electrostatic latent image recorded on said receiving member.

6. An apparatus according to claim 5, wherein said developing means includes:

first developing means for developing the first electrostatic latent image with marking particles of a first color; and second developing means for developing the second electrostatic latent image with marking particles of a second color.

7. An apparatus according to claim 6, wherein the color of one of the marking particles is black and the color of the other marking particles is of a color other than black to print a color highlighted document.

8. An apparatus according to claim 6, wherein said projecting and recording means records a third electrostatic latent image after said developing means develops the second electrostatic latent image and after said neutralizing means neutralizes the second electrostatic latent image.

9. An apparatus according to claim 8, wherein said developing means includes third developing means for developing the third electrostatic latent image with marking particles of a third color.

10. An apparatus according to claim 9, wherein said transferring means transfers the first, second, and third color marking particles substantially simultaneously from said receiving member to the document to print multicolor information thereon.

11. An apparatus according to claim 10, wherein the color of the marking particles of said first developing means is cyan, the color of the marking particles of said second developing means is magenta, and the color of the marking particles of said third developing means is yellow.

12. An apparatus according to claim 9, wherein said said projecting and recording means records a fourth electrostatic latent image after said developing means develops the third electrostatic latent image and said neutralizing means neutralizes the third electrostatic latent image.

13. An apparatus according to claim 13, wherein said developing means includes a fourth developing means for developing the fourth electrostatic latent image with marking particles of a fourth color.

14. An apparatus according to claim 14, wherein the color of the marking particles of said first developing means is cyan, the color of the marking particles of said second developing means is magenta, the color of the marking particles of said third developing means is yellow, and the color of the marking particles of said fourth developing unit is black.

* * * * *